No. 803,644. PATENTED NOV. 7, 1905.
S. TURUDIJA.
TRIGGER ARRANGEMENT OF FIREARMS.
APPLICATION FILED APR. 18, 1904.

3 SHEETS—SHEET 1.

Witnesses:

Inventor:
Stanislaus Turudija
by W. E. Boxter
his Attorney.

No. 803,644. PATENTED NO 7, 1905.
S. TURUDIJA.
TRIGGER ARRANGEMENT OF FIREARMS.
APPLICATION FILED APR. 18, 1904.

3 SHEETS—SHEET 2

Witnesses.

Inventor.
Stanislaus Turudija
by W. E. Boulter
his Attorney.

No. 803,644. PATENTED NOV. 7, 1905.
S. TURUDIJA.
TRIGGER ARRANGEMENT OF FIREARMS.
APPLICATION FILED APR. 18, 1904.
3 SHEETS—SHEET 3.
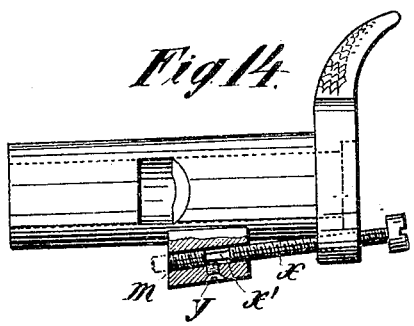
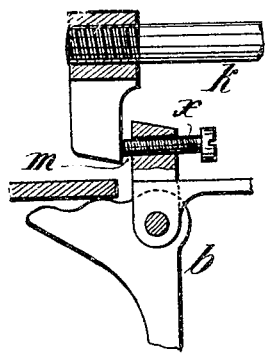
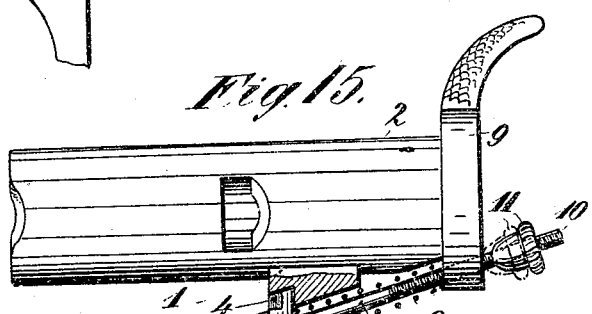
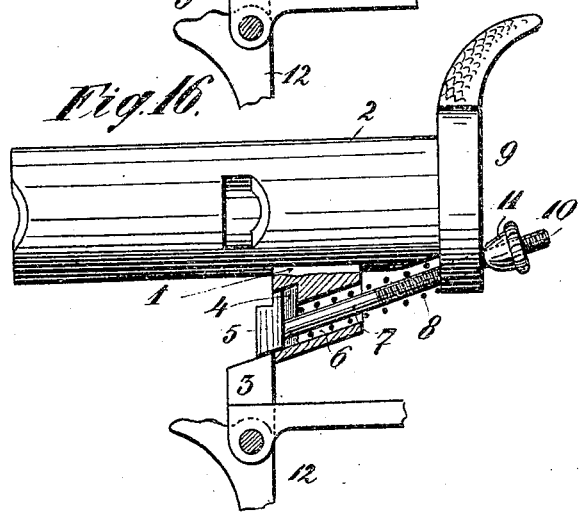
Witnesses:
Inventor:
Stanislaus Turudija
by H. E. Boulter
his Attorney.

UNITED STATES PATENT OFFICE.

STANISLAUS TURUDIJA, OF TRIEST, AUSTRIA-HUNGARY.

TRIGGER ARRANGEMENT OF FIREARMS.

No. 803,644.	Specification of Letters Patent.	Patented Nov. 7, 1905.

Application filed April 18, 1904. Serial No. 203,760.

*To all whom it may concern:*

Be it known that I, STANISLAUS TURUDIJA, first lieutenant in the Royal and Imperial Austrian infantry regiment No. 97, a citizen of Austria-Hungary, and a resident of Triest, Austria-Hungary, have invented certain new and useful Improvements in the Trigger Arrangement of Firearms, of which the following is a full, clear, and exact specification.

The present invention has reference to the trigger arrangement of hand-firearms, and has for its chief object to prevent the kicking of the firearm by too rapid discharge and also to indicate to the marksman by touch the extreme limit of the trigger.

I employ a supporting-rod within the area of the finger-piece in such a way that the latter can only be discharged by sliding the firing-finger along this supporting-rod. In this connection the arrangement can preferably be such that the marksman is compelled absolutely to effect the discharge in the manner prescribed, this being assured by the special formation of the finger-piece guard, the rearward part thereof, if necessary, forming the supporting-rod itself. The invention also embodies a construction whereby the trigger can be operated without any support, while in case there should be a separate support for the sear this is so arranged as to enable it also to be thrown out of gear, and, finally, it also comprises a disconnectible arrangement which gives an audible indication that the finger is beginning to make end play over the supporting-rod.

In the accompanying illustrative drawings several constructional forms of the improved trigger device are shown.

Figure 1:
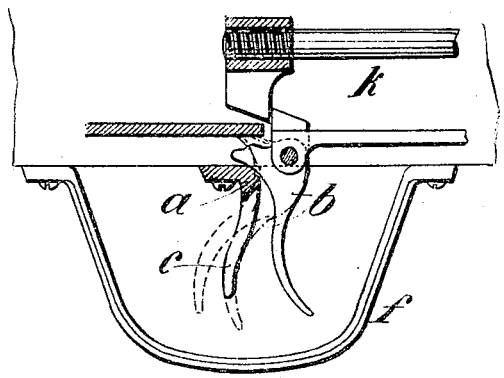
Figure 2:
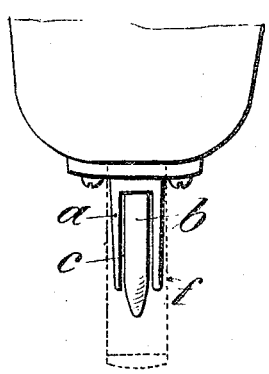
Figure 3:
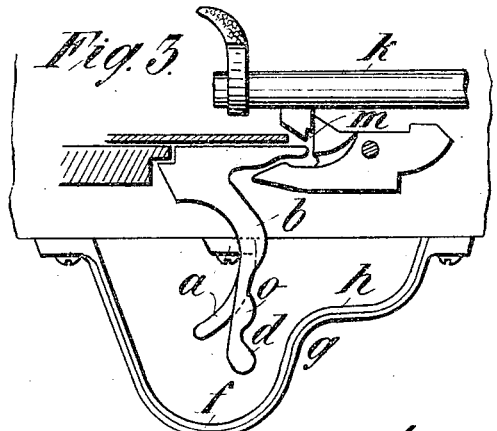
Figure 5:
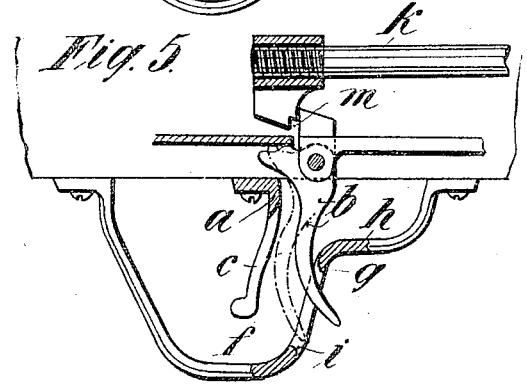
Figure 6:
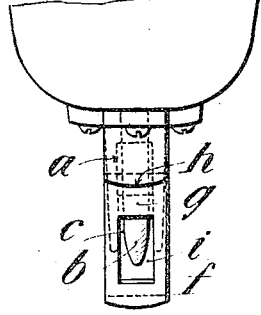
Figure 7:
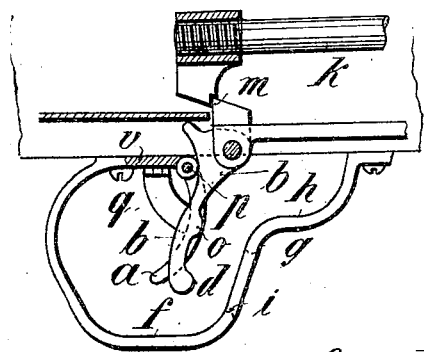
Figure 8:
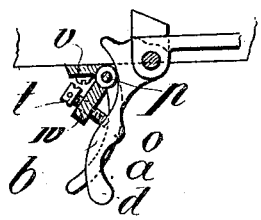
Figure 9:
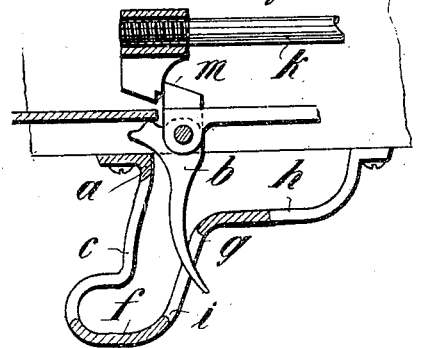
Figure 10:
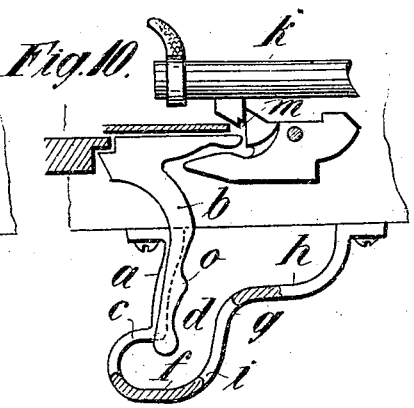
Figure 11:
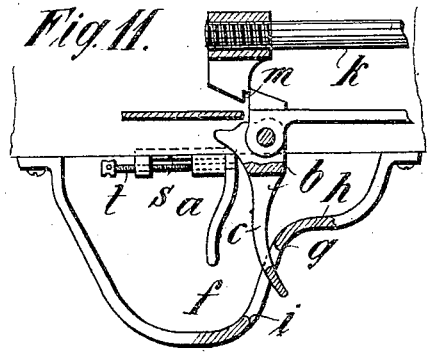
Figure 12:
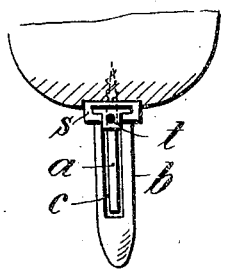

Figure 1 is a longitudinal section, and Fig. 2 a rear view, of the simplest constructional form of the device by locating a slotted supporting-rod in the vertical plane of the barrel-axis directly behind the trigger finger-piece. Fig. 3 is a longitudinal section, and Fig. 4 a rear elevation, of a constructional form of the device with a supporting-rod and another trigger device arranged by the side of the trigger finger-piece. Fig. 5 shows in section, and Fig. 6 in front elevation, a constructional form of the device with a peculiarly-formed finger-piece guard, which latter compels the marksman to fire by using the supporting-rod. Fig. 7 is a constructional form of the device in longitudinal section with a specially-formed finger-piece and an adjustable supporting-rod. Fig. 8 shows in longitudinal section another constructional form of the adjustable and fixable supporting-rod. Figs. 9 and 10 show in longitudinal section two constructional forms of the device wherein the rearward portion of the finger-piece guard itself forms the supporting-rod. Figs. 11 and 12 show in longitudinal section and front elevation a constructional form with an unslotted supporting-rod adjustable in the direction of the barrel and with a slotted trigger finger-piece. Figs. 13 and 14 show two constructional forms of the disconnectible sear-rest that is preferably used in conjunction with the aforesaid arrangement, while Figs. 15 and 16 show the arrangement which audibly indicates that the finger is beginning to make end play along the supporting-rod.

As already stated at the beginning, the subject-matter of the invention consists in the arrangement of a supporting-rod $a$ within the area of the trigger finger-piece $b$ whose forwardly-directed face is so formed that when the finger-piece $b$ is partly drawn back it wholly or partially coincides with the front side of the latter, so that on pulling the finger-piece in a horizontal direction in a given period of time an artificial check or rest produced as the marksman is now compelled to let his firing-finger slide down along the supporting-rod $a$ till he has reached the end of the finger-piece projecting beyond the lower edge of the supporting-rod $a$, which is made somewhat shorter than the trigger finger-piece $b$, and can then complete the firing. According to the constructional form shown in Figs. 1 and 2 this supporting-rod $a$ is arranged in the axis of the barrel immediately behind the trigger finger-piece $b$ and has a slot $c$, through which on firing the finger-piece partly penetrates. (See the position of the finger-piece shown in dots and dashes in Fig. 1.)

Figure 4:
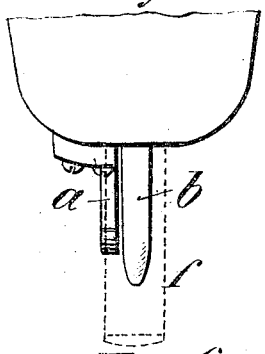

In the constructional form according to Figs. 3 and 4 the supporting-rod $a$ is located at the side of and close to the finger-piece $b$; but for the rest it operates in exactly the same way as the constructional form according to Figs. 1 and 2.

In the constructional form of the arrangement according to Figs. 1 and 2 it is not absolutely out of the question for the marksman to fire without stopping, avoiding the artificial rest by simply beginning to fire at once at the lower end of the finger-piece; but this requires a great exertion of strength, especially in connection with military weapons. Now in order to absolutely compel the marksman to use the supporting-rod $a$ and the artificial rest thereby produced in accordance with the constructional form shown in Figs. 3 to 12 the trigger-guard $f$ is provided with a throat or curve $g\ h$, one part $g$ whereof is more or less parallel to the axis of the supporting-rod $a$, while its other part $h$ is more or less parallel to the axis of the barrel. This curve is so arranged as to leave the necessary space between the guard $f$ and the supporting-rod $a$ for the trigger-finger and, if necessary, it is provided with a suitable aperture $i$, Figs. 5, 6, 7, 9, 10, 11, and 12, for the passage of the end of the finger-piece. If the marksman applies the pull directly to the end of the finger-piece, he can only move it up to the entrance into the slot $i$ of the trigger-guard $f$, (see dotted position in Fig. 5;) but this does not enable him to fire off the shot. Hence in order to fire off the shot the marksman is compelled to grip the finger-piece $b$ within the guard $f$, whereby he can work the trigger, but only by using the supporting-rod $a$ and the rest thereby produced. This rest, however, gives the marksman the time necessary to level his weapon with care and take a sharp sight, whereby the likelihood of hitting is substantially enhanced.

For weapons with a sear-spring arrangement it is advisable to make the arrangement in such a way that the percussion-bolt $k$ snaps into the sear-notch $m$ when the finger commences to make its end play (rest) along the supporting-rod, this position of the parts being shown in Fig. 7.

In Figs. 3 and 7 a constructional form of the trigger finger-piece is also shown which is specially suitable for sear-spring weapons, its object being not only to enable the marksman to hear, by the percussion-bolt engaging with the sear-spring rest, but also to feel the said engagement with the sear-spring rest. This purpose is attained by the arrangement of two pressure-knobs $o$ and $d$ of the finger-piece $b$, of which the one, $d$, is placed at the end of the finger-piece and the other on the finger-piece in such wise that when it is completely pressed into the slot $c$ of the supporting-rod $a$ (see the position of the parts in Fig. 7) the firing has been effected right up to the sear-spring rest. The finger-piece $b$ again freed (released) by this falling into engagement now again falls somewhat forward and by lightly falling upon the trigger-finger gives a palpable signal that the firing has been effected right up to the sear-spring rest, so that careful aim must now be taken and the shot discharged at a suitable period of time. The construction form shown in Fig. 7 also shows that on placing the knob $d$ at the end of the finger-piece it is not necessary to allow the lower end of the trigger finger-piece to project below the lower end of the supporting-bar $a$. Hence both parts $a$ and $b$ can be of equal length.

To enable, if necessary or if desired, shots to be fired without the sear-spring rest, the arrangement can be so made as to admit of the supporting-rod $a$ being removed or, as shown in Figs. 7, 8, and 11, it can be adjustably and fixably mounted upon the weapon. According to Fig. 7 this is effected in that the supporting-rod $a$ is connected to its attachment place $v$ by means of a hinge $p$, a check-rail $q$ being placed behind it at the neck of the breech. According to Fig. 8 this supporting-rod $a$, which can also be turned down, can be fixed in position by means of a screw $t$, adjustable in an extension $w$ of the attachment-plate $v$, which screw admits both of the most exact adjustment of the supporting-rod $a$ and also of its entire disconnection by screwing it backward. Finally, according to the constructional form shown in Figs. 11 and 12 the supporting-rod $a$ can be slid backward and forward parallel to the axis of the barrel by means of sliding guides $s$ and by means of a screw $t$, guided in a nut fastened on the butt or guided in the trigger finger-piece, can be adjusted and fixed in position or drawn back so far that it is placed entirely out of action. Figs. 11 and 12 also show a constructional form of the device according to which the supporting-rod $a$, placed behind the finger-piece $b$, has the slot $c$ for the passage of the rod.

Instead of mounting a separate supporting-rod $a$ on the weapon the rear portion of the trigger-guard can also be used for the formation of this supporting-rod, as shown in Figs. 9 and 10. According to these constructional forms the trigger-guard $f$ in its rear portion is contracted toward the finger-piece $b$ and is formed in such wise that it forms, together with the surface facing the finger-piece $b$, the supporting-rod and its firing-surfaces $a$. To admit of the passage of the trigger $b$ on firing, this part $a$ of the guard $f$ is slotted at $c$ for a suitable width and length.

For those weapons the mechanism of which is mounted together with a movable and adjustable supporting-rod and a sear or hair trigger rest upon one of the trigger-surfaces, it is necessary in putting the supporting-rod $a$ out of action to also check the operation of the hair-trigger rest $m$ when the discharge is to be effected at one operation. Especially suitable for this purpose are the constructional forms of the hair-trigger rest shown in Figs. 13 and 14, according to which the rest $m$ is formed by a screw $x$, which is screwed into that part of the trigger mechanism where it is desired to have the rest. In the constructional form shown the extension of the percussion-bolt nut is provided with the rest $m$, and consequently the screw $x$ is screwed into this part in the direction of the axis of the barrel. According as to whether the screw $x$ be pushed backward or forward its end projects more or less over the trigger-surface of the extension or it passes behind this surface, and thus in the first instance forms with the part located between it and the trigger edge a rest $m$ of corresponding depth, Fig. 13, while when the screw $x$ is drawn back the trigger without rest moves forward. The screw can of course also be located in the trigger extension or in the locking portion of the trigger finger-piece with the same action. A retaining-screw $y$, engaging with a groove $x'$ in the neck, Fig. 14, of the screw $x$ restricts the terminal positions of the screw $x$. When the front face of the screw $x$ gets worn out, the depth of the rest can in the latter case be again adjusted by prolonging the groove in the neck toward the head of the screw.

Now in those cases where there is no hair-trigger rest $m$ in order to also audibly indicate to the marksman that the parts of the trigger are ready to release the fire-pin—i. e., in that period of the action when the finger makes its full travel along the supporting-rod $a$—the following arrangement is used, as hereinafter described and illustrated in Figs. 15 and 16. The extension or projection 1 of the percussion-bolt nut 2 has on its trigger-face a recess 4, adapted to receive a slide 5, which extends toward the rear into a boring 6, that is traversed by a rod 7, connected to the slide 5, and receives one end of a spiral spring 8, surrounding the latter. The rod 7 also passes loosely through the sleeve 9 of the percussion-bolt nut 2 and is provided at the end with a screw-thread 10, upon which a nut 11 can be screwed. With one end the spring 8 bears against the rear side of the slide 5 and with its other end against the front of the sleeve 9 and always endeavors to press the slide 5 out of the recess 4 and out of the face of the extension 1. When the percussion-bolt spring is cocked, however, its predominant tensile power presses back the slide 5, while compressing the spring 8 into the plane of the trigger-surface, so that on pulling the trigger the contiguous surfaces of the projections 1 and 3 can slide apart without let or hindrance. As soon as the firing operation has progressed so far that the front surface of the slide 5 is posed (see the position of the parts in Fig. 16) the latter springs forward under the action of its spring 8. At the same time the nut 11 strikes against the rear side of the percussion-bolt nut, and thus gives an audible signal that warns the marksman that the parts 1 and 3 are now ready for the final discharge, and a further lesser expenditure of force (pull) releases the shot. If directly after hearing this signal the finger-piece 12 be released, the projection 3 will lock against the under side of the projecting slide 5, so that an artificial hair-trigger is produced. On turning the nut 11 in the corresponding direction the slide 5 can be permanently held in its recess, and the firing can be effected without an audible signal being given and without a hair-trigger.

The device can be placed in or out of action at any time without danger, even if the weapon be loaded, whether the breech be opened or shut and whether the percussion-bolt be cocked or uncocked.

Instead of upon the fence 1 the device may also be mounted on the projection 3 of the finger-piece 12; but then the above-mentioned advantages of easier connection or disconnection in any state of the weapon are not available. It must, furthermore, still be pointed out that the arrangement hereinbefore described is entirely independent of the trigger mechanism of the weapon and can be applied not only to military weapons, but also to firearms for civil use. It must also be pointed out as a further special advantage of the arrangements hereinbefore described that they are especially favorable to the learning of correct sighting and firing, so that they will do good service in the army in connection with gunnery instruction.

Having now particularly described and ascertained the nature of my said invention and in what manner the same is to be performed, I declare that what I claim is—

1. In trigger mechanism for hand-firearms, the combination with a trigger finger-piece, of a supporting-bar arranged in proximity to the trigger finger-piece, the latter extending below the said supporting-bar and said bar having its forwardly-directed face formed to coincide with the front face of the finger-piece and forming an artificial rest for the finger of the marksman as and for the purpose specified.

2. In trigger mechanism for hand-firearms, the combination with a trigger finger-piece, of a supporting-bar arranged in proximity to the trigger finger-piece, the latter extending below the said supporting-bar and said bar having its forwardly-directed face formed to coincide with the front face of the finger-piece and forming an artificial rest for the finger of the marksman, one of said elements being slotted for the passage through the slot of the other element.

3. In trigger mechanism for hand-firearms, the combination with a trigger finger-piece, of a supporting-bar arranged immediately behind the trigger finger-piece and provided with a slot to admit of the passage of the finger-piece on firing, the said supporting-bar having its forwardly-directed face formed to coincide with the front face of the finger-piece and forming an artificial rest for the finger of the marksman as specified.

4. In trigger mechanism for hand-firearms, the combination with a trigger finger-piece, of a supporting-bar arranged in proximity to the trigger finger-piece, said bar being adjustable toward and from the finger-piece, the latter extending below the supporting-bar and said bar having its forwardly-directed face formed to coincide with the front face of the finger-piece and forming an artificial rest for the finger of the marksman as and for the purpose specified.

5. In trigger mechanism for hand-firearms, the combination with a trigger finger-piece, of a supporting-bar arranged in proximity to the trigger finger-piece, the latter extending below the said supporting-bar and said bar having its forwardly-directed face formed to coincide with the front face of the finger-piece and forming an artificial rest for the finger of the marksman and a trigger-guard having a bend or neck $g$, $h$, that is formed by a part of the guard more or less parallel to the barrel and another part more or less parallel to the supporting-rod.

6. In trigger mechanism for hand-firearms, the combination with a trigger finger-piece, of a supporting-bar arranged in proximity to the said finger-piece and having its forwardly-directed face formed to coincide with the front face of the finger-piece and forming an artificial rest for the finger of the marksman.

7. In trigger mechanism for hand-firearms, the combination with a trigger finger-piece, of a supporting-bar arranged in proximity to the said finger-piece and having its forwardly-directed face formed to coincide with the front face of the finger-piece and forming an artificial rest for the finger of the marksman, the percussion-bolt, a sear-spring rest mounted on one of the trigger-surfaces and comprising an adjustably-arranged screw, and an extension on the percussion-bolt nut adapted to coöperate with the said screw.

In testimony that I claim the foregoing as my invention I have signed my name in presence of two subscribing witnesses.

STANISLAUS TURUDIJA.

Witnesses:
WASA THEODOROVIC,
WILHELM BERGER.